Feb. 8, 1966  R. B. RANSOM  3,233,844
LINE PICKUP MECHANISM FOR A SPINNING REEL
Filed Dec. 20, 1962  2 Sheets-Sheet 1
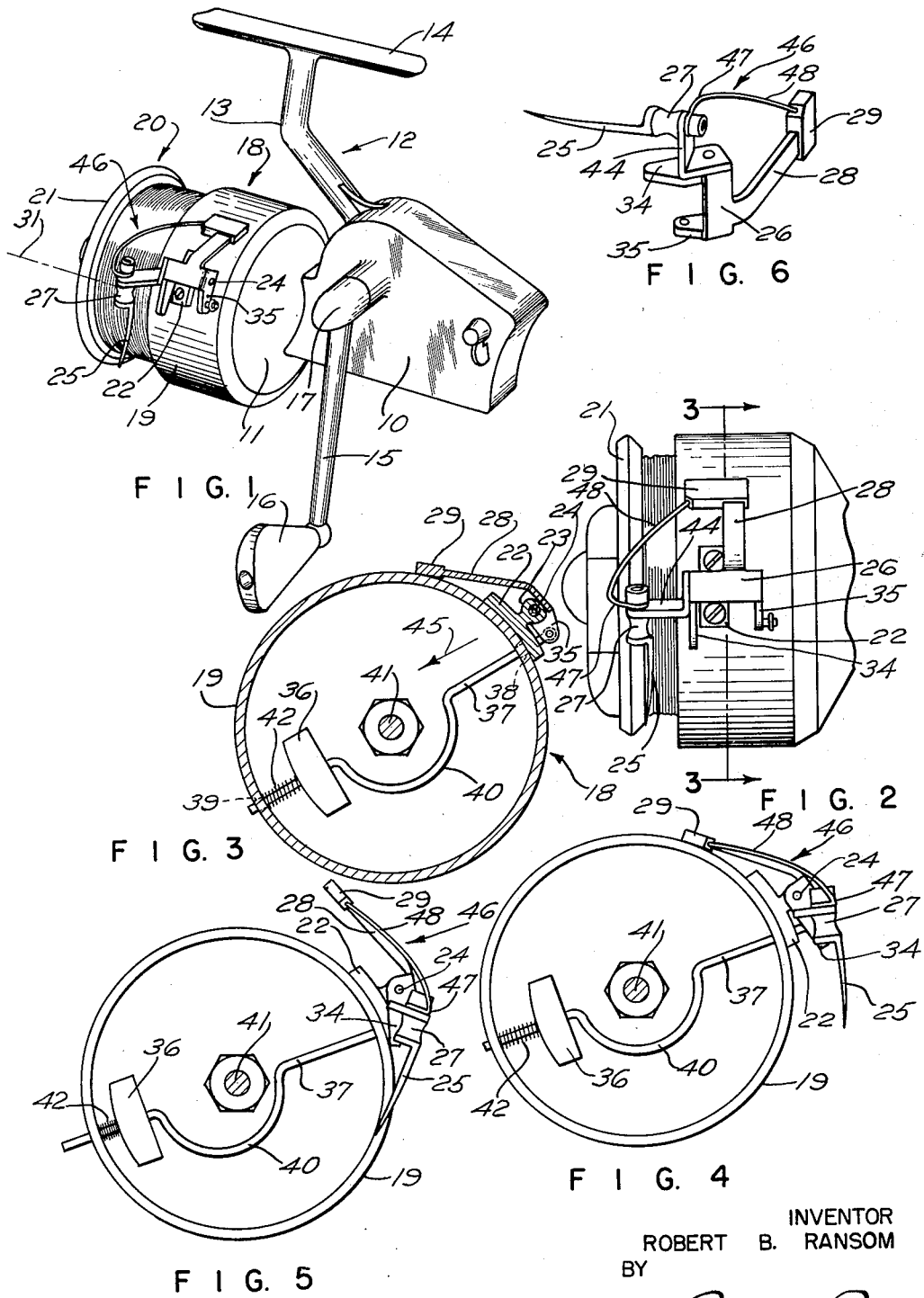
INVENTOR
ROBERT B. RANSOM
BY
Barlow & Barlow
ATTORNEYS Feb. 8, 1966 R. B. RANSOM 3,233,844
LINE PICKUP MECHANISM FOR A SPINNING REEL
Filed Dec. 20, 1962 2 Sheets-Sheet 2

INVENTOR
ROBERT B. RANSOM
BY
Barlow + Barlow
ATTORNEYS

United States Patent Office 3,233,844
Patented Feb. 8, 1966

3,233,844
LINE PICKUP MECHANISM FOR A
SPINNING REEL
Robert B. Ransom, Westerly, R.I.
(N. Williams Road, Weekapaug, R.I.)
Filed Dec. 20, 1962, Ser. No. 246,177
6 Claims. (Cl. 242—84.2)

This invention relates to a fishing line reel of the so-called spinning type in which the line is discharged from the reel over the end of a spool and in which the line is reeled on to the spool by some winding device which rotates relative to the spool.

Heretofore, the winding device has had a line pickup finger fixed on the winding device and often may interfere with the free discharge of the line over the end of the spool when ballooning of the line occurs due to the rapid discharge of the line from the spool, this especially being the situation when the spool is too full of line.

One of the objects of this invention is to provide a line pickup finger which will move out of the way when the line is discharged and will not be touched by the ballooning of the line.

Another object of the invention is to provide a line pickup finger which, although it is well out of the way when the line is discharged, may be rapidly moved into a position to pick up the line when reeling of the line about the spool is desired.

Another object of the invention is to provide an arrangement which will cause the relative movement of the line winder and the spool to direct the pickup finger into a position so that the line will be picked up and wound upon the spool.

Another object of this invention is to provide a pickup device which will not move into pickup position at the time of casting due to inertia force.

Another object of the invention is to provide a pickup device which may be simple in construction, assembly and operation so that complicated forms of construction need not be dealt with.

With these and other objects in view, the invention consists of certain novel features of construction as will be more fully described and particularly pointed out in the appended claims.

In the accompanying drawings:

FIG. 1 is a perspective view of a fishing reel equipped with this invention;

FIG. 2 is a fragmental side elevation;

FIG. 3 is a section on line 3—3 of FIG. 2;

FIG. 4 is an end view of the cup with the spool removed and the center shaft in section;

FIG. 5 is similar to FIG. 4 with the parts in a different position;

FIG. 6 is a perspective view of the pickup finger unit which is mounted on the winder;

Figure 7:
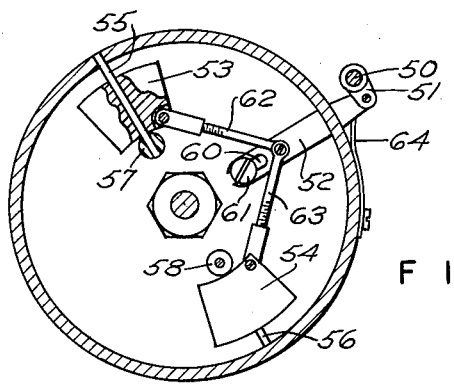
FIG. 7 is a sectional view similar to FIG. 3 of a modified structure.
Figure 9:
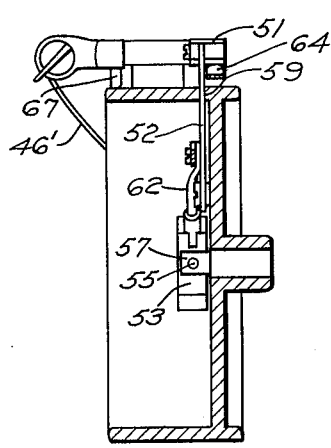
FIG. 9 is a section view of the modified structure.

This invention, as it applies to a spool and a cup shape winder which are relatively reciprocal and rotatable, proceeds on the basis of a movably mounted pickup finger fulcrumed on the external cylindrical surface of the winder and movable as the winder rotates and the spool reciprocates so as to move the finger towards the axis of rotation into a position to pick up the fishing line and, when picked up, wind it on the spool, the pickup finger being actuated by centrifugal force.

With reference to the drawings, 10 designates a gear casing upon one end of which there is a base 11 while a bracket designated generally 12 comprises an angular arm 13 having a saddle plate 14 which will receive the fishing rod. A crank 15 having a handle 16 may be rotated to turn a shaft having a hub 17 to actuate the gears in the casing 10. A rotatable cup shape line winder designated generally 18 has an outer cylindrical surface 19, while within this winder there is located a spool 20 having an outer head 21 which spool is non-rotatably mounted upon a center shaft 41 as an axis for reciprocation into and out of the cup 18, and as this reciprocation into and out of the cup without rotation occurs, the winder or cup 18 rotates about the spool. This is accomplished by a mechanism such as shown in the prior United States Patents, No. 2,687,855 of August 31, 1954 and No. 2,879,954 of March 31, 1959 and others and constitutes no direct part of the invention which is hereinafter described.

Upon the outer cylindrical surface 19 of the winder 18, there is a boss 23 providing a bearing, this boss being shown as carried by a bracket 22 secured to the cup wall. A shaft 24 is mounted in this bearing on an axis parallel to the axis of rotation of the winder 18 and will revolve about the winder axis. This shaft 24 rotatably mounts a unit shown by itself in FIG. 6 which comprises a bracket 26 having upper and lower flanges to extend over the ends of boss 23 with openings to receive the shaft 24. The pickup finger 25 extends from the arm 44 of this bracket at one side of the shaft and at a height to swing over the upper edge of the cup with a concave surface roller 27 close to its mounting arm so that as the line is picked up and slid along the tapered suface of the finger 25, it will lodge into the reduced portion of the roller 27 and there be maintained during the rotation of the winder about the spool. The line when in this position also assists in holding the pickup finger swung inwardly toward the axis of the spool and winder. An arm 28 extends from the bracket 26 providing an elongated weight with a concentration of mass at its outer end 29. This weight acts as a counterweight and is such that when the winder is rotated, it will through centrifugal force swing the finger 25 inwardly toward the axis of the spool and thus into a position so that it will pick up the line 31 extending from the spool over the flange of the head 21. It might be explained that the gearing mechanism is such as to rotate the winder 18 about three times for every revolution of the handle, thus causing the winder to operate at a high velocity and one which will create sufficient centrifugal force on the weight 29 to swing it outwardly and the finger 25 inwardly to position the finger toward the axis of rotation as desired. A stop 34 extends from bracket 26 to engage the cup and limit the inward movement of the pickup finger.

The lower flange of bracket 26 is also provided with an arm 35 extending away from the shaft 24 in substantially the opposite direction from the extent of arm 28 upon which weight 29 is mounted, and to which arm 35 there is connected a concentration of weight 36 within the cup by means of a link 37 which is slidably mounted in openings 38 and 39 at substantially diametrically opposite points of the cup 18. This link is curved outwardly as at 40 so as to arch about the center shaft 41 upon which the spool 20 is mounted. This link lies along the bottom of the cup and beneath the spool so as to in no way interfere with the spool. A spring 42 acting between the inside wall of the cup and the weight 36, which is fixed on the link 37, serves to push this link in a direction so as to swing the pickup finger 25 away from the axis of the spool as shown in FIG. 4. It will also be observed that the weight 36 is located on the opposite side of the axis of the cup from the location of the weight 29, and as the cup rotates, centrifugal force will tend to move the weight 36 outwardly from the axis of the cup. Thus it will be apparent that the concentration of weight 36 will move outwardly away from the axis of the cup and also the concentration of weight at 29 will swing outwardly away from the axis of the cup, and both of these weights will cooperate or work together tending to swing the pickup finger 25 inwardly toward the axis of the cup. However, in casting should the rod be moved in the general direction of a plane defined by shaft 41 and pivot 24, the inertia of the weights 29 and 36 would counteract or balance each other, thus if movement occured in the direction of arrow 45, there would then be a tendency for inertia to swing the weight 29 outwardly and thus swing the pickup finger 25 inwardly. However, movement in this plane in the direction illustrated by arrow 45 would also cause the inertia of the weight 36 acting through arm 35 to tend to move the pickup finger 25 outwardly, and as this finger is already in the outward position due to the action of spring 42, the two weights 29 and 36 arranged in the location as shown more clearly in FIG. 3 balance each other, and such a movement of the rod in the plane of the rod and axis of the spool and substantially in the direction shown by arrow 45 will provide a balance so that the pickup finger 25 will not be swung inwardly to pick up the line and thus interfere with the cast.

Figure 8:
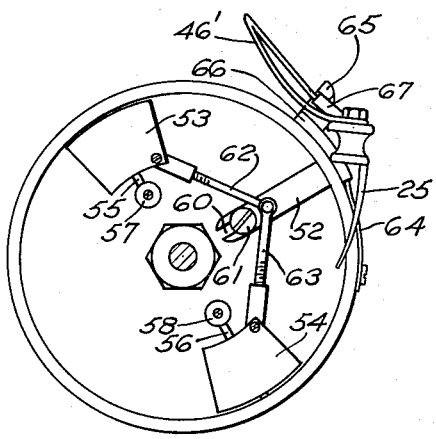
FIG. 8 is an end view similar to FIG. 4 of the modified structure in a different position.
Figure 10:
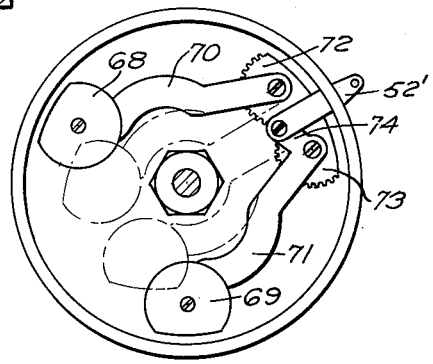
FIG. 10 is a section view of a different modified structure.

This balancing relation of the weighting means above described may also be carried out as shown in FIGS. 7 and 8. In these figures the pivotal shaft 50 which carries the pickup finger 25 at its lower end carries an arm 51 to which link 52 is connected and extends inwardly through the side wall of the cup. Here, all the weighting means is located within the cup. Thus the weight is divided into two parts or two concentrations of weight 53 and 54 which slide on rods 55 and 56 between their outer position at the inner surface of the cup and stops 57 and 58 on the inner ends of the rods 55 and 56. These weights are connected by additional links 62 and 63 to the link 52 so that as these weights move inwardly or outwardly due to centrifugal force, they will act together on the link 52 tending to swing the arm 51 clockwise and consequently the pickup finger inwardly as centrifugal force acts upon these weights 53 and 54. However, any movement which by reason of inertia of the weights affects the operation of the pickup arm is balanced out as these weights are located on opposite sides of the center of the cup and thus will balance each other and prevent the inertia of the weights from moving the pickup finger 25. The link 52 is guided in its movement by the slot 59 in the side wall of the cup and also by the slot 60 in the link 52 guided on the shank of the screw 61.

A spring 64 acts upon the arm 51 tending to hold the weights in their innermost position as shown in FIG. 7, whereas movement due to centrifugal force moves these weights outwardly against the action of this spring to the position shown in FIG. 8. A stop 65 is located on a bracket 66 and engages the short arm 67 attached to the upper portion of the shaft 50 so as to limit the inward movement of the pickup finger.

vent this, I provide a fairing guide 46 with a raised nose 47 and a long arcuate portion 48 extending to the concentration of weight 29 so as to guide the line 31 over the pickup finger when any such reverse motion occurs.

A fairing guide 46' may be used for the same purpose as fairing guide 46 above referred to.

I claim:

1. In a fishing reel having a spool and a concentric line winder, means for attaching the reel to a rod, said means mounting the line winder for rotation about said spool on an axis extending substantially in the direction of the axis of the rod, means to rotate said winder, a line pickup finger, means to pivotally mount said finger on said line winder, a first weighting means and a second weighting means, means connecting each of said weighting means to said pickup finger, said weighting means both acting by centrifugal force as said line winder is rotated relative to the spool through said connecting means on said pickup finger to swing the finger toward the axis of the spool to pick up the line, said two weighting means being so located relative to the axis of rotation of the winder as to provide a resultant balance of centrifugal forces when rotated, said location also being such that movement of the pivot axis of the winder in a direction tending to move one of said weighting means to swing the pickup finger inwardly is offset by the tendency of the other weighting means to swing the pickup finger outwardly.

2. In a fishing reel as in claim 1 wherein the winder is a cup and one weighting means is outside the cup and the other weighting means is within the cup.

3. In a fishing reel having a spool and a concentric line winder, means for attaching the reel to a rod, said means mounting the line winder for rotation about said spool on an axis extending substantially in the direction of the axis of the rod, means to rotate said winder, a line pickup finger, means to pivotally mount said finger on said line winder on an axis substantially parallel to the axis of the winder and spaced from the axis of the winder on one side thereof for movement toward and from the axis of the spool, a first weighting means connected to said pickup finger comprising an arm extending generally radially from the pivotal axis of said finger in one direction and a second weighting means connected to said pickup finger comprising an arm extending generally radially from the pivot axis of the finger in generally the opposite direction with a concentration of weight spaced from the axis of the winder on the other side thereof, said two weighting means at least partially balancing each other when the axis of the winder is moved in a direction away from the axis of said finger pivot, both of said weighting means acting by centrifugal force as said line winder is rotated relative to the spool to swing said finger toward the axis of the spool to pick up the line and cause it to rotate with the winder to assemble the line on the spool.

4. In a fishing reel as in claim 3 wherein the second said weighting means comprises a link extending substantially diametrically of said winder axis.

5. In a fishing reel as in claim 3 wherein the second said weighting means comprises a link extending substantially